US011400649B2

(12) United States Patent
Patel et al.

(10) Patent No.: US 11,400,649 B2
(45) Date of Patent: Aug. 2, 2022

(54) AIR KNIFE ASSEMBLY FOR ADDITIVE MANUFACTURING

(71) Applicant: Applied Materials, Inc., Santa Clara, CA (US)

(72) Inventors: Dakshalkumar Patel, Gujarat (IN); Girish Kumar Chaturvedi, Bangalore (IN); Bahubali S. Upadhye, Bangalore (IN); Sumedh Acharya, Bangalore (IN); Mahendran Chidambaram, Saratoga, CA (US); Nilesh Chimanrao Bagul, Karnataka (IN)

(73) Assignee: Applied Materials, Inc., Santa Clara, CA (US)

( * ) Notice: Subject to any disclaimer, the term of this patent is extended or adjusted under 35 U.S.C. 154(b) by 104 days.

(21) Appl. No.: 16/684,519

(22) Filed: Nov. 14, 2019

(65) Prior Publication Data

US 2021/0094229 A1    Apr. 1, 2021

(30) Foreign Application Priority Data

Sep. 26, 2019    (IN) .............................. 201941038919

(51) Int. Cl.
*B29C 64/205*    (2017.01)
*B29C 64/255*    (2017.01)
(Continued)

(52) U.S. Cl.
CPC .......... *B29C 64/205* (2017.08); *B29C 64/241* (2017.08); *B29C 64/245* (2017.08);
(Continued)

(58) Field of Classification Search
CPC ... B29C 64/205; B29C 64/264; B29C 64/245; B29C 64/255; B29C 64/236;
(Continued)

(56) References Cited

U.S. PATENT DOCUMENTS 6,193,923 B1    2/2001    Leyden et al.
6,215,093 B1    4/2001    Meiners et al.
(Continued)

FOREIGN PATENT DOCUMENTS

| CN | 105331952 | 2/2016 |
| CN | 106623928 | 5/2017 |

(Continued)

OTHER PUBLICATIONS

PCT International Search Report and Written Opinion in International Appln. No. PCT US/2020/052795, dated Dec. 17, 2020, 14 pages.

*Primary Examiner* — Seyed Masoud Malekzadeh
(74) *Attorney, Agent, or Firm* — Fish & Richardson P.C.

(57) ABSTRACT

An additive manufacturing apparatus includes an environmentally sealed first chamber, a second chamber separated from the first chamber by a first valve, a platform positionable in the first chamber, a dispenser configured to deliver a plurality of successive layers of feed material onto the platform in the first chamber, at least one energy source to selectively fuse feed material in a layer on the platform in the first chamber, and an air knife assembly to direct a laminar flow of air across a layer of feed material on the platform in the first chamber. The air knife assembly includes an inlet module and an exhaust module that are movable through the first valve between the first chamber and the second chamber.

16 Claims, 11 Drawing Sheets

(51) Int. Cl.

| | |
|---|---|
| *B29C 64/236* | (2017.01) |
| *B29C 64/209* | (2017.01) |
| *B29C 64/159* | (2017.01) |
| *B29C 64/259* | (2017.01) |
| *B29C 64/227* | (2017.01) |
| *B22F 10/322* | (2021.01) |
| *B22F 12/53* | (2021.01) |
| *B22F 12/55* | (2021.01) |
| *B22F 12/00* | (2021.01) |
| *B22F 12/70* | (2021.01) |
| *B22F 12/50* | (2021.01) |
| *B29C 64/264* | (2017.01) |
| *B29C 64/245* | (2017.01) |
| *B29C 64/241* | (2017.01) |
| *B33Y 30/00* | (2015.01) |

(52) U.S. Cl.
CPC .......... *B29C 64/255* (2017.08); *B29C 64/264* (2017.08); *B22F 10/322* (2021.01); *B22F 12/224* (2021.01); *B22F 12/50* (2021.01); *B22F 12/53* (2021.01); *B22F 12/55* (2021.01); *B22F 12/70* (2021.01); *B29C 64/159* (2017.08); *B29C 64/209* (2017.08); *B29C 64/227* (2017.08); *B29C 64/236* (2017.08); *B29C 64/259* (2017.08); *B33Y 30/00* (2014.12)

(58) Field of Classification Search
CPC ... B29C 64/159; B29C 64/209; B29C 64/227; B29C 64/259; B22F 10/22; B22F 10/224; B22F 10/32; B22F 10/322; B22F 10/50; B22F 10/53; B22F 10/55; B22F 10/70
See application file for complete search history.

(56) References Cited

U.S. PATENT DOCUMENTS

| | | | |
|---|---|---|---|
| 6,338,438 B1 | 1/2002 | Walzel et al. | |
| 6,696,664 B2 | 2/2004 | Pyritz et al. | |
| 7,067,021 B2 | 6/2006 | Fujita et al. | |
| 7,261,542 B2 | 8/2007 | Hickerson et al. | |
| 7,326,377 B2 | 2/2008 | Adams | |
| 8,718,522 B2 | 5/2014 | Chillscyzn et al. | |
| 8,895,893 B2 * | 11/2014 | Perret | B23K 26/1464 219/121.85 |
| 9,776,362 B2 | 10/2017 | Chuang et al. | |
| 9,956,612 B1 | 5/2018 | Redding et al. | |
| 10,232,439 B2 * | 3/2019 | Gold | B23K 26/123 |
| 10,252,333 B2 * | 4/2019 | McMurtry | B08B 15/04 |
| 10,668,533 B2 * | 6/2020 | Ng | B29C 64/188 |
| 10,875,093 B2 * | 12/2020 | Ng | B22F 1/10 |
| 11,033,968 B2 * | 6/2021 | Sutcliffe | B22F 12/00 |
| 11,154,935 B2 | 10/2021 | Upadhye et al. | |
| 11,273,606 B2 * | 3/2022 | Wigen | B22F 12/90 |
| 2003/0075836 A1 | 4/2003 | Fong | |
| 2007/0241482 A1 | 10/2007 | Giller | |
| 2011/0059247 A1 | 3/2011 | Kuzusako et al. | |
| 2014/0263209 A1 | 9/2014 | Burris et al. | |
| 2015/0041025 A1 | 2/2015 | Wescott et al. | |
| 2016/0001401 A1 | 1/2016 | Dimter et al. | |
| 2016/0121398 A1 * | 5/2016 | Schlick | B22F 12/00 425/11 |
| 2016/0136731 A1 | 5/2016 | Mcmurtry et al. | |
| 2016/0243619 A1 * | 8/2016 | Gothait | C09D 11/033 |
| 2017/0014906 A1 * | 1/2017 | Ng | B29C 64/364 |
| 2017/0120330 A1 | 5/2017 | Sutcliffe et al. | |
| 2017/0216916 A1 * | 8/2017 | Nyrhilä | B33Y 30/00 |
| 2018/0126460 A1 * | 5/2018 | Murphree | B22F 12/00 |
| 2018/0126650 A1 * | 5/2018 | Murphree | B08B 5/04 |
| 2018/0200963 A1 | 7/2018 | Bogdan, Jr. et al. | |
| 2018/0221953 A1 * | 8/2018 | Ng | B22F 10/20 |
| 2018/0222116 A1 * | 8/2018 | Ng | B29C 64/209 |
| 2018/0236603 A1 * | 8/2018 | Carter | B22F 10/20 |
| 2019/0176233 A1 | 6/2019 | Varetti et al. | |
| 2019/0240924 A1 | 8/2019 | Hendrik | |
| 2019/0366434 A1 | 12/2019 | Upadliye et al. | |
| 2020/0061655 A1 * | 2/2020 | Wakelam | B22F 12/00 |
| 2020/0094320 A1 * | 3/2020 | Krol | B33Y 50/02 |
| 2020/0261975 A1 | 8/2020 | Higashi et al. | |
| 2021/0016507 A1 * | 1/2021 | Wigen | B22F 12/90 |

FOREIGN PATENT DOCUMENTS

| | | | |
|---|---|---|---|
| CN | 206169294 | 5/2017 | |
| DE | 102010052206 B4 * | 6/2015 | ............ B22F 12/00 |
| EP | 2001656 | 12/2008 | |
| JP | 3621703 | 2/2005 | |
| JP | 2007-021747 | 2/2007 | |
| JP | 5400042 | 1/2014 | |
| JP | 2015-104837 | 6/2015 | |
| KR | 10-2019-0016736 | 2/2019 | |
| WO | WO 97-08592 | 5/1992 | |
| WO | WO 2015/056230 | 4/2015 | |
| WO | WO 2015/170330 | 11/2015 | |
| WO | WO 2017/013454 | 1/2017 | |

* cited by examiner

AIR KNIFE ASSEMBLY FOR ADDITIVE MANUFACTURING

TECHNICAL FIELD

This disclosure relates to an air knife system for additive manufacturing, also known as 3D printing.

BACKGROUND

Additive manufacturing (AM), also known as solid freeform fabrication or 3D printing, refers to a manufacturing process where three-dimensional objects are built up from successive dispensing of raw material (e.g., powders, liquids, suspensions, or molten solids) into two-dimensional layers. In contrast, traditional machining techniques involve subtractive processes in which objects are cut out from a stock material (e.g., a block of wood, plastic, composite, or metal).

A variety of additive processes can be used in additive manufacturing. Some methods melt or soften material to produce layers, e.g., selective laser melting (SLM) or direct metal laser sintering (DMLS), selective laser sintering (SLS), or fused deposition modeling (FDM), while others cure liquid materials using different technologies, e.g., stereolithography (SLA). These processes can differ in the way layers are formed to create the finished objects and in the materials that are compatible for use in the processes.

In some forms of additive manufacturing, a powder is placed on a platform and a laser beam traces a pattern onto the powder to fuse the powder together to form a shape. Once the shape is formed, the platform is lowered and a new layer of powder is added. The process is repeated until a part is fully formed.

SUMMARY

In one aspect, an additive manufacturing apparatus includes a platform, a dispenser configured to deliver a plurality of successive layers of feed material onto the platform, at least one energy source to selectively fuse feed material in a layer on the platform, an air knife unit comprising an inlet module and an exhaust module spaced apart from and facing the inlet module, and an air knife moving assembly rotatably coupled to the air knife unit to move the air knife unit along a surface of the platform. The air knife moving assembly includes a retractable telescopic scissor assembly having a first pair of arms each having a first end rotatably coupled to a stationary portion of the additive manufacturing apparatus and a second pair of arms each having a second end rotatably coupled to the air knife unit. The retractable telescopic scissor assembly has a supply conduit that fluidically connects a gas inlet in the stationary portion to the inlet module and a return conduit that fluidically connects the exhaust module to a gas outlet in the stationary portion, each conduit extending continuously along arms of the retractable telescopic scissor assembly.

Implementations may include one or more of the following features.

The air knife moving assembly may include a blower fluidically coupled to the supply conduit to supply gas to the supply conduit and fluidically coupled to the return conduit to receive gas from the return conduit. The blower may be configured to flow gas along the supply conduit and the return conduit at substantially equal rates.

A guide rail may be configured to guide the air knife unit along the surface of the platform as the retractable telescopic scissor assembly retracts or extends to move the air knife unit.

The retractable telescopic scissor assembly may include a first arm assembly and a second arm assembly. The first arm assembly may have the supply conduit and return conduit, and the second arm assembly may have a second supply conduit and a second return conduit. Each arm of the first pair of arms may be rotatably coupled to and movable by a respective actuator at the stationary portion. The pair of arms may be configured to rotate, upon being actuated by the respective actuator, inwardly or outwardly to extend or retract the retractable telescopic scissor assembly. The return conduit may be a return chamber and the supply conduit may be disposed inside the return chamber. The air knife unit may further include a third supply conduit fluidically coupled to the supply conduit of the retractable telescopic scissor assembly to receive gas from the supply conduit. The third supply conduit may be fluidically coupled to the inlet module of the air knife unit to deliver gas to the inlet module.

In another aspect, an additive manufacturing apparatus includes an environmentally sealed first chamber, a second chamber separated from the first chamber by a first valve, a platform positionable in the first chamber, a dispenser configured to deliver a plurality of successive layers of feed material onto the platform in the first chamber, at least one energy source to selectively fuse feed material in a layer on the platform in the first chamber, and an air knife assembly to direct a laminar flow of air across a layer of feed material on the platform in the first chamber. The air knife assembly includes an inlet module and an exhaust module that are movable through the first valve between the first chamber and the second chamber.

Implementations may include one or more of the following features.

A controller may be configured to cause the first valve to open, cause an actuator to move the inlet module and exhaust module through the valve from the second chamber to the first chamber, cause the air knife assembly to direct a laminar flow of air across a layer of feed material on the platform in the first chamber while the energy source selectively fuses feed material in the layer, cause the actuator move the inlet module and exhaust module through the valve from the first chamber to the second chamber, and cause the first valve to close. The controller may be configured to cause the dispenser to further comprising to deliver a subsequent layer of feed material over the platform while the inlet module and exhaust modules are in the second chamber.

The air knife assembly may include a support for the inlet module and exhaust module, and the support is extendible from and retractable into the second chamber. The support may be a retractable telescopic scissor assembly.

A third chamber may be separated from the first chamber by a second valve, and the dispenser may be movable through the second valve between the third chamber and the first chamber. The controller may be configured to, while the first valve is closed, cause the second valve to open, cause a first actuator to move the dispenser through the second valve from the third chamber to the first chamber, cause the dispenser to deliver a layer of feed material over the platen, cause the first actuator to move the dispenser through the second valve from the first chamber to the third chamber, and close the second valve.

In another aspect, an additive manufacturing apparatus includes an environmentally sealed first chamber, a second chamber separated from the first chamber by a valve, a platform positionable in the first chamber, a dispenser configured to deliver a plurality of successive layers of feed material onto the platform in the first chamber, the dispenser movable through the valve between the first chamber and the second chamber, at least one energy source to selectively fuse feed material in a layer on the platform in the first chamber; and an air knife assembly to direct a laminar flow of air across a layer of feed material on the platform in the first chamber.

Implementations may include one or more of the following features.

A controller may be configured to cause the valve to open, cause a first actuator to move the dispenser through the second valve from the third chamber to the first chamber, cause the dispenser to deliver a layer of feed material over the platen, cause the first actuator to move the dispenser through the second valve from the first chamber to the third chamber, and close the second valve. The controller may be configured to cause the energy source to selectively fuse the layer feed material and cause the air knife assembly to direct the laminar flow of air across the layer of feed material while the dispenser is in the second chamber. The dispenser may be movable along a linear rail.

Particular implementations of the subject matter described in this disclosure can be implemented so as to realize, but are not limited to, one or more of the following advantages.

The air knife assembly can extend and retract smoothly along a linear path to cover different regions of the build plate. The air knife assembly can be retracted to allow the dispenser to deliver feed material over the entire build platform. The air knife assembly can also be retracted into a sealed compartment so that the components of the air knife are not present during delivery of powder onto the build plate, thus reducing the likelihood of contamination of the air knife.

Gas can flow across a powder bed at a speed that is uniform both across the build plate or platform and along the z-axis perpendicular to the build plate. Gas can flow at a uniform speed across a width of about 1000 millimeters to cover a large area or an entire width of the platform. The vertical arrangement of the air knife assembly can increase the uniformity of the delivered gas over the platform while reducing the horizontal footprint of the air knife assembly. The gas can have a flow velocity sufficient, e.g., 1 m/s to 5 m/s, to carry away spatter induced by metal vapor. This can reduce undesirable inclusions in the part being fabricated and improve performance of the part.

The details of one or more implementations are set forth in the accompanying drawings and the description. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
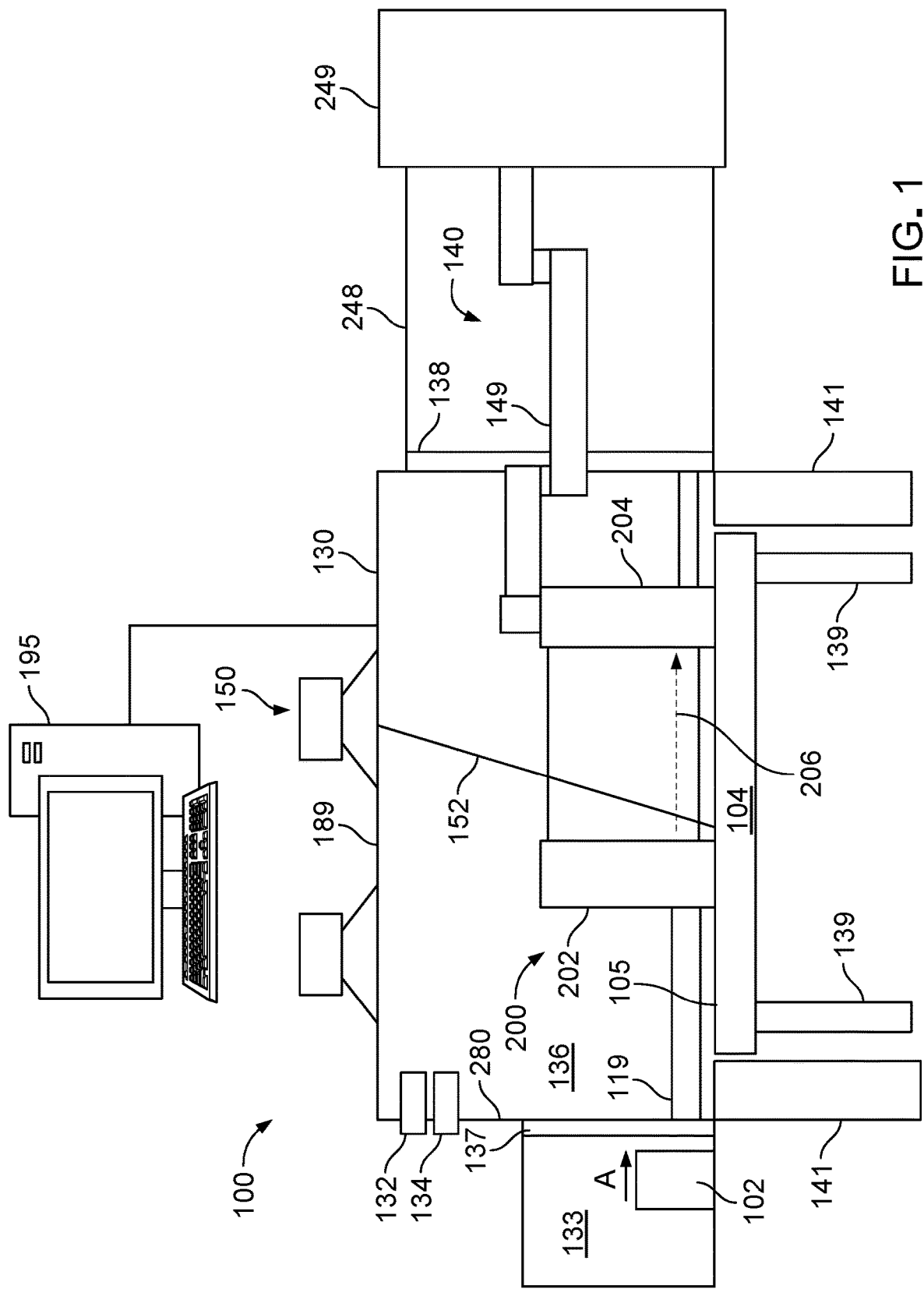
FIG. 1 is a schematic side view of an example additive manufacturing apparatus.

In many additive manufacturing processes, energy is selectively delivered to a layer of feed material, e.g., powder, dispensed by the additive manufacturing apparatus to fuse the feed material in a pattern, thereby forming a portion of an object. For example, a light beam, e.g., a laser beam, can be reflected off a galvo scanner or a rotating polygon scanner to drive the light beam in a path across the layer of feed material. During this fusing process, vapor can be generated as the powder is fused. For example, where the feed material is a metal powder, vapor trapped in the metal powder can be released when the metal is melted. In addition, a portion of the liquid metal itself could be vaporized. This vapor can generate spatter. For example, liquid portions of the molten pool of metal can be ejected when the vapor boils out of the metal, powder particles can similarly be blown from the layer of powder by the vapor escaping from the liquid metal, and vaporized metal can precipitate to form a liquid. At the 'interaction zone' where the laser beam interacts with the metal powder, the 'recoil pressure' can induce high velocity 'melt-flow' ejection from the interaction zone. Consequently, some powder particles can get enough energy to be blown off from the powder layer (on the build platform). When these 'air borne powder particles' intersect with the laser-beam path, they burn spontaneously (because laser beam energy for singular particles is high enough to burn them) to form a burnt debris. This spatter can contaminate surrounding regions of the part (e.g., the fused metal powder layer), resulting in undesirable inclusions, which can negatively impact the performance of the object.

A technique to reduce spatter is to use an "air knife" to blow the vapor and/or spatter away from the layer, thus reducing the likelihood of contamination. One of the major requirements of an air-knife is to be efficient in removing these burnt debris from the freshly fused metal powder layer. However, any non-uniformity in the air flow from the knife can result in inefficient spatter mitigation. An air knife having some or all of the features described below can provide improved uniformity of air flow across the build plate.

Another issue is that the air knife can occupy space needed for other operations, e.g., depositing powder onto the bed. Moreover, when powder is being delivered onto the bed, there is some risk that small amounts of powder can stick to other surfaces in the chamber. By retracting the air knife into a sealed chamber, space is freed up for other components and the risk of contamination of the air knife is reduced.

Another issue is that production of high quality parts may occur inside a housing or chamber of limited space. Thus, construction of an additive manufacturing system having an air knife assembly with a reduced footprint can allow the additive manufacturing system to use a large portion of the platform area for part production.

Additive Manufacturing Apparatus

FIG. 1 illustrates a schematic side view of an example additive manufacturing (AM) apparatus 100 that includes an air knife assembly or unit 200, a printhead 102, and a build platform 104 (e.g., a build stage). The printhead 102 dispenses layers of one or more powders on a top surface 105 of the platform 104. By repeatedly dispensing and fusing layers of powder, the apparatus 100 can form a part on the platform.

The air knife assembly 200, the printhead 102, and the build platform 104 can both be enclosed in a housing 130 that forms a sealed central chamber 136 that provides a controlled operating environment, e.g., a vacuum chamber. For example, the central chamber 136 can be vacuumed out to bring down the oxygen concentration to less than 1% of the air to then add an inert gas inside the chamber 136 to maintain a low level of contaminants and unnecessary gas concentrations. The inert gas can be used by the air knife assembly 200 to form a laminar curtain above the build platform.

The housing 130 can also include an air knife storage chamber 248, e.g., a load lock chamber, on one side of the central chamber 136 and a printhead storage chamber 133 on an opposite side of the central chamber 136. In some implementations, the air knife storage chamber 248 and the printhead storage chamber 133 can be disposed on adjacent perpendicular side walls of the central chamber 136.

The central chamber 136 can include an inlet 132 coupled to a gas source and an outlet 134 coupled to an exhaust system, e.g., a pump. The gas source can provide an inert gas, e.g. Ar, or a gas that is non-reactive at the temperatures reached by the powder for melting or sintering, e.g., $N_2$. This permits the pressure and oxygen content of the interior of the housing 130 to be controlled. For example, oxygen gas can be maintained at a partial pressure below 0.01 atmospheres.

The central chamber 136 may be maintained at atmospheric pressure (but at less than 1% oxygen) to avoid the cost and complexity of building a fully vacuum compatible system. Oxygen content can be below 50 ppm when the pressure is at 1 atmosphere, e.g., when dealing with Titanium (Ti) powder particles. Because metal powder can be highly reactive (particularly Ti) due to its high surface-area-to-volume ration, oxygen concentration at less than 1% or less than 50 ppm helps avoid the spontaneous burning of metal powder upon excitation by the laser-beam. Thus, it is imperative to maintain low oxygen concentration and an inert gas environment to reduce the possibility of burning of metal powders.

The air knife assembly 200 is movable by an air knife moving assembly 140 that includes a retractable telescopic scissor assembly 149. The retractable telescopic scissor assembly 149 extends or retracts to move the air knife assembly 200 laterally across the platform 104. The platform can move downward as the additive manufacturing process progresses. For example, the build platform 104 can move downward by the thickness of one layer after each layer is deposited and fused. The build platform 104 can be vertically movable on a track 139, e.g., a rail.

The air knife storage chamber 248 (see FIGS. 4A and 5A) accessible through a valve 138, e.g., a slit valve, can be used to separate the central chamber 136 from the air knife storage chamber 248 to isolate the retracted air knife assembly 200 from the central chamber 136 during the deposition of material by the print head 102. The air knife assembly 200 can be retracted into and stored in the air knife storage chamber 248, which can be sealed off by the slit valve 138. The air knife assembly 200 can be isolated from the central chamber 136 to remove the printed piece from the central chamber 136 or to move the printhead 102 across the platform 104 to dispose printing material.

The printhead 102 can be retracted into the printhead storage chamber 133, which can be sealed off by another slit valve 137, similar to the slit valve 138 of the air knife storage chamber 248. In some implementations, to remove the printed part from the platform 104, the platform 104 can be lowered and slid out, with the part still on the platform 104.

Figure 2A:
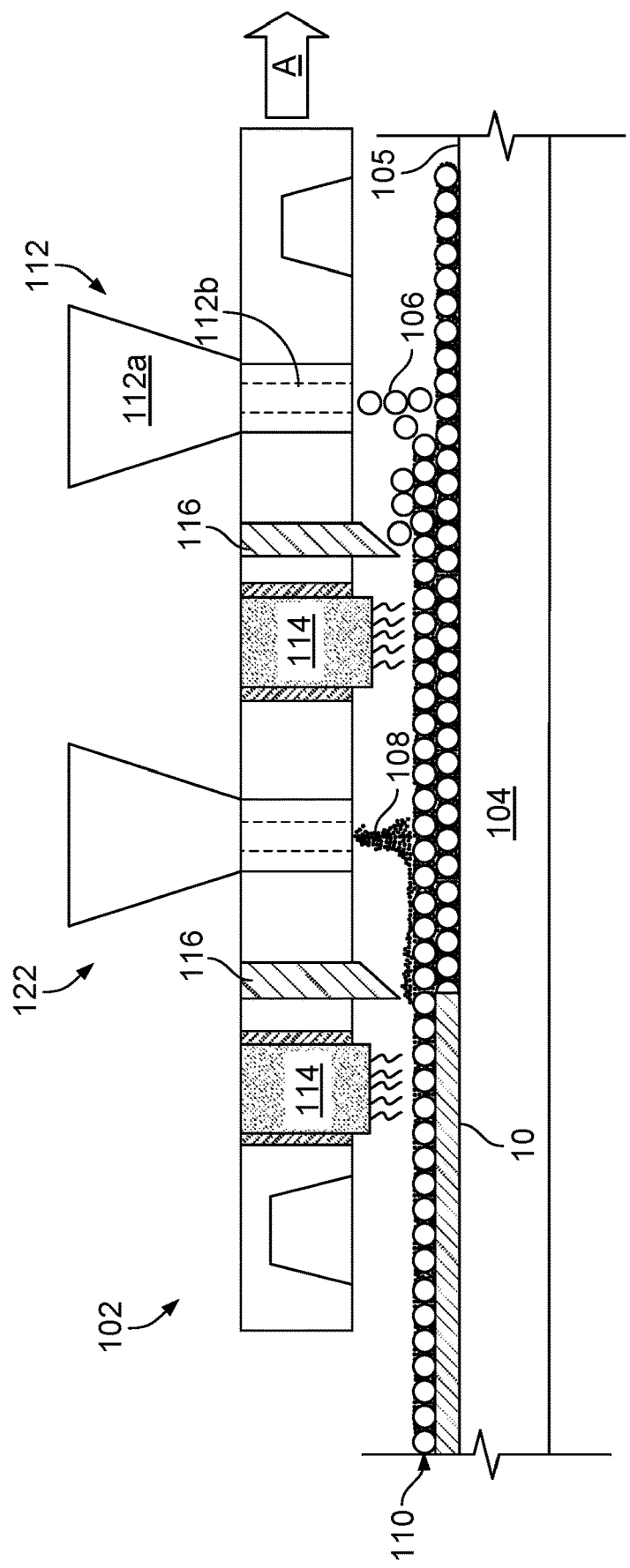
FIGS. 2A and 2B are schematic side and top views of a printhead from the additive manufacturing apparatus.
Figure 2B:
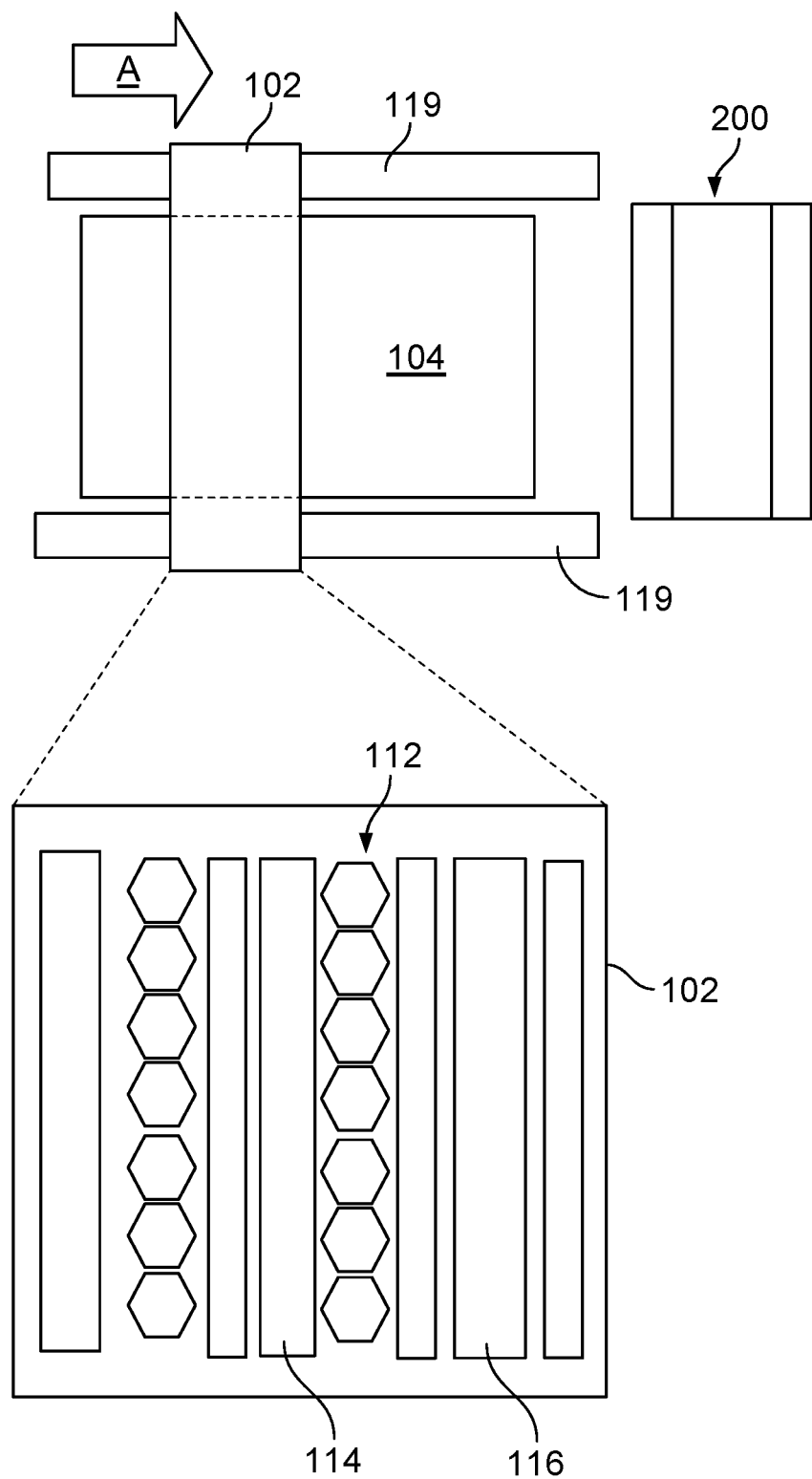

Referring to FIGS. 1 and 2B, the printhead 102 is configured to traverse the platform 104 laterally (shown by arrow A), which can be in the same direction that the air knife assembly 200 travels during processing of the layer. In some implementations, the air knife assembly 200 is retracted into its chamber 248 before using the printhead 102, and vice versa, so that the print head 102 and the air knife assembly 102 do not move or work over the platform 104 at the same time. For example, the apparatus 100 can include a support, e.g., a linear rail or pair of linear rails 119, along which the printhead 102 can be moved by a linear actuator and/or motor (not shown). This permits the printhead 102 to move across the platform 104 along a first horizontal axis. In some implementations, the printhead 102 can move along a second horizontal axis perpendicular to the first axis instead of or in addition to moving along the first axis.

The air knife assembly 200 can move over the platform 104 continuously or in discrete steps during the printing process. When the air knife assembly 200 does not move continuously, the air knife assembly 200 is placed over a certain region of the platform 104, and after the laser fuses the material over the region, then the air knife assembly 200 can move to cover a new region of the platform 104.

Referring to FIGS. 1A, 2A and 2B, the platform 104 is movable along a vertical axis while the air knife assembly 200 and the printhead 102 are movable along a horizontal axis. In particular, after each layer of material 110 is fused to form a portion of the part 10, the platform 104 is lowered by an amount equal to the thickness of the deposited layer 110 of powder. This can maintain a constant height difference between the dispenser on the printhead 102 and the top of the powder on the platform 104. A drive mechanism, e.g., a piston or linear actuator, can be connected to the platform 104 or support holding the platform to control the height of the platform.

As shown in FIGS. 2A and 2B, the printhead 102 includes at least a first dispenser 112 to selectively dispense a layer 110 of a powder 106 on the build platform 104, e.g., directly on the build platform 104 or on a previously deposited layer. In the implementation illustrated in FIG. 2A, the first dispenser 112 includes a hopper 112a to receive the powder 106. The powder 106 can travel through a channel 112b having a controllable aperture, e.g., a valve, that controls whether the powder is dispensed onto the platform 104. In some implementations, the first dispenser 112 includes a plurality of independently controllable apertures, so that the powder can be controllably delivered along a line perpendicular to the direction of travel A.

Optionally, the printhead 102 can include one or more heaters 114 to raise the temperature of the deposited powder. As the printhead 102 moves in the forward direction, the heater 114 moves across the area where the first dispenser 112 was previously located. The printhead 102 can also include one or more spreaders 116, e.g., rollers or blades, that cooperate with the dispensing system 112 to compact and spread powder dispensed by the first dispenser 112. In some implementations, the printhead 102 includes a second dispenser 122 to dispense a second powder 108 with a smaller mean diameter than the first particles 106, e.g., by a factor of two or more.

In implementations when multiples types of powders are used, the first and second dispensers 112, 122 can deliver the first and the second powder particles 106, 108 each into different selected areas, depending on the resolution requirement of the portion of the object to be formed.

Examples of metallic particles include metals, alloys and intermetallic alloys. Examples of materials for the metallic particles include titanium, stainless steel, nickel, cobalt, chromium, vanadium, and various alloys or intermetallic alloys of these metals. Examples of ceramic materials include metal oxide, such as ceria, alumina, silica, aluminum nitride, silicon nitride, silicon carbide, or a combination of these materials.

In implementations with two different types of powders, in some cases, the first and second powder particles 106, 108 can be formed of different materials, while, in other cases, the first and second powder particles 106, 108 have the same material composition. In an example in which the apparatus 100 is operated to form a metal object and dispenses two types of powder, the first and second powder particles 106, 108 can have compositions that combine to form a metal alloy or intermetallic material.

The processing conditions for additive manufacturing of metals and ceramics are significantly different than those for plastics. For example, in general, metals and ceramics require significantly higher processing temperatures. Thus, 3D printing techniques for plastic may not be applicable to metal or ceramic processing and equipment may not be equivalent. However, some techniques described here could be applicable to polymer powders, e.g. nylon, ABS, polyetheretherketone (PEEK), polyetherketoneketone (PEKK) and polystyrene.

Returning back to FIG. 1, the apparatus 100 also includes at least one energy delivery system 150 that can generate at least one light beam 152 that is directed toward the uppermost layer of powder on the platform 104 and that can be used at least for fusing of the layer of powder on the platform 104. The light beam 152 and/or another light beam can be used for pre-heating and/or heat-treating the layer of powder.

The air knife assembly 200 generates a flow of gas (shown by arrow 206) across the layer of power. This flow of gas 206 can help reduce spatter or burnt waste caused by fusing of the powder by the light beam 152. As noted above, the air knife assembly 200 can translate across the build platform 104. The printhead 102 and the air knife assembly 200 are independently movable. In some implementations, the air knife assembly 200 can translate along the same direction (e.g., shown by arrow A) as the printhead 102. Alternatively, the printhead 102 can translate along a horizontal direction perpendicular to the direction traveled by the air knife assembly 200.

Figure 3A:
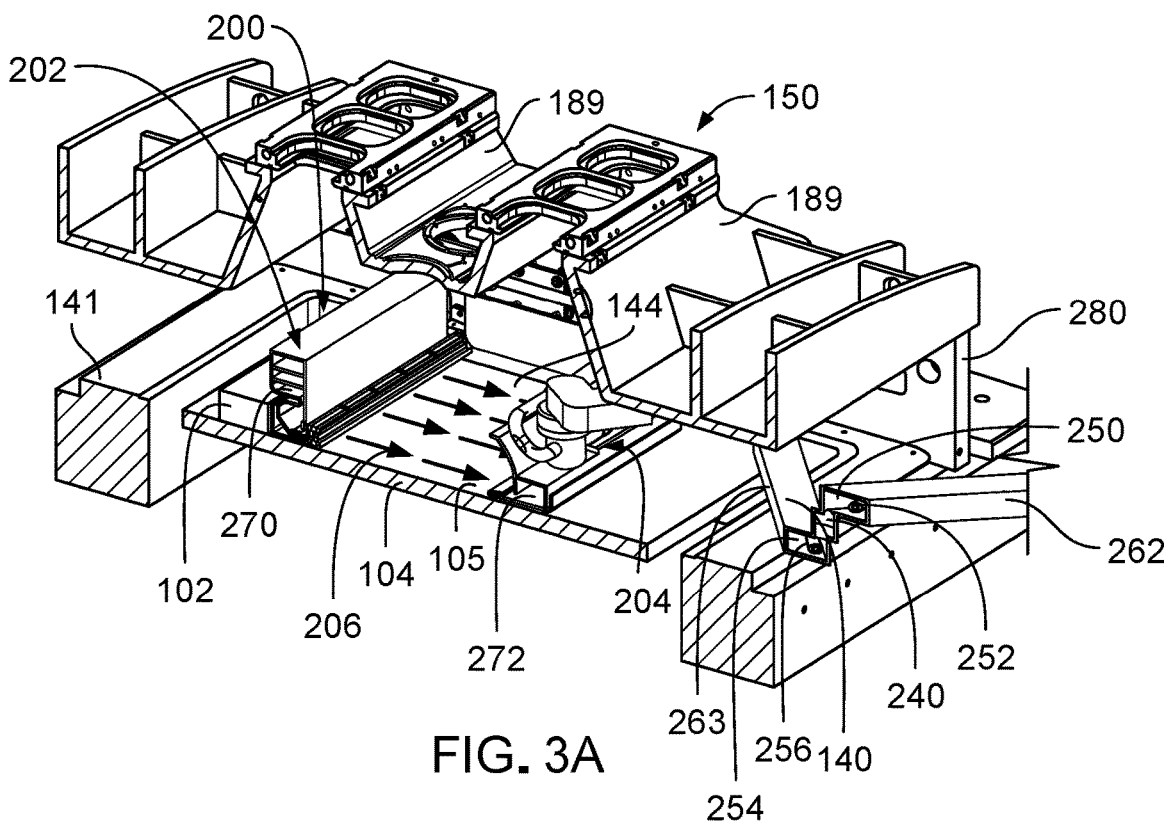
FIG. 3A is a schematic perspective view, partially cross-sectional, of the additive manufacturing apparatus.

Referring to FIGS. 1 and 3A, the energy delivery system 150 can include an upper frame 189 to which various components, e.g., components of the energy delivery system 150, are secured. In some implementations, the upper frame 189 is a portion of the housing 130, e.g., the ceiling of the housing 130. A lower frame 141 can surround the build platform 104. This lower frame 141 can be a portion of the housing 130. The upper frame 189 can be secured to the lower frame 141 by a side wall 280, e.g., a side wall of the housing 130. Although FIGS. 1 and 3A illustrate the frames 189 and 141 forming the closed housing, the frames 189 and 141 can be configured as an open framework sitting within the housing 130.

Figure 3B:
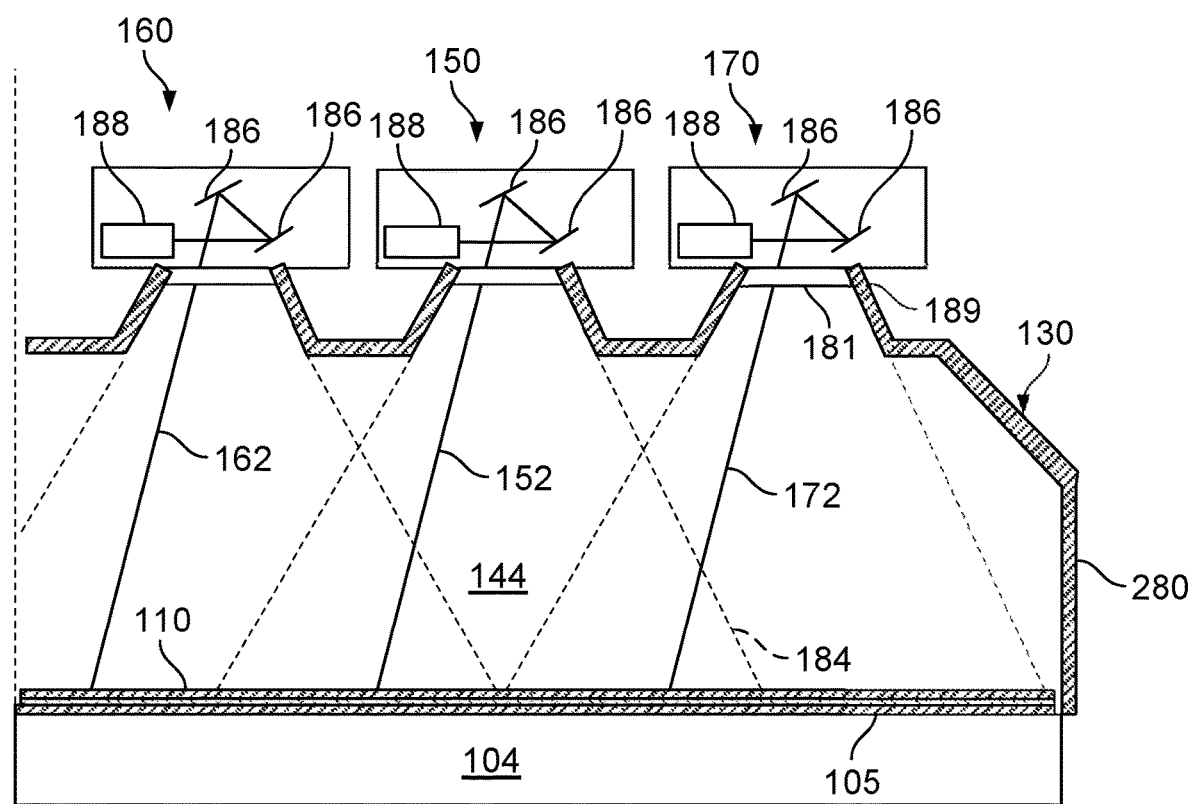
FIG. 3B is a schematic cross-sectional front view of a portion of the additive manufacturing apparatus from FIG. 3A.

Referring also to FIG. 3B, the frames 189 and side wall 280 (see FIG. 3) define an open volume 144 that extends from the surface 105 of the build platform 104 to the optical components of the energy delivery system 150. The open volume 144 at least encompasses a field of view 184 of the energy delivery system 150, i.e., the region through which the light beam(s) 152 can sweep to scan the layer 110 of powder. The air knife assembly is configured to generate the flow of gas across a portion of the open volume 144 that is adjacent the layer 110 on the build platform 104.

The energy delivery system 150 includes at least one light source to generate at least one light beam 152 and at least one reflector assembly to scan the light beam 152 on the layer 110 of powder.

Referring to FIG. 3B, in some implementations, the energy delivery system 150 includes windows 181 defined by apertures at the top of the housing 130, e.g., apertures in the upper frame 189. The windows 181 can be formed of quartz or similar transmissive material. The energy delivery system 150 can include a beam scanning system above each window 181 at the top of the housing 130. The optical assembly of the beam scanning system can include two galvo mirrors, a polygon, or something more complex.

For example, the energy delivery system 150 includes a first beam scanning system 160, a second beam scanning system 170, and a third beam scanning system 150. The three beam scanning systems 160, 170, 150 generate three light beams 162, 172, 152, respectively, that are scanned on the layer 110 of powder. Each beam scanning system 150, 160, and 170 can include an optical assembly that could include dual galvo mirrors 186, or a polygonal mirror scanner, in order to drive the light beam in a path across the layer 110 of powder. Each beam scanning system can also include various focusing optics. Each beam scanning system 160, 170, 150 can be secured to the frame 189 (see FIG. 1).

The scanning systems 150, 160, and 170 can include a light source 188, e.g., a laser, to generate a light beam, e.g., a laser beam. The light source 188 can be a light-emitting diode, e.g., a 400-450 nm blue light emitting diode, a laser, e.g., a 500-540 nm second harmonic laser, or another appropriate light source.

In some implementations, the field 184 of the first light beam 152 and the field of the second and third beams each cover the entire width of the build area on the platform 104.

The various beam scanners 160, 170, 150 can each be used for pre-heating of the powder, fusing of the powder, and/or heat treatment of the layer. In the case of pre-heating, a light beam raises the temperature of the powder from an initial temperature to an elevated temperature that is still below the temperature at which the powder melts or fuses. In the case of fusing, a light beam scans the layer of powder and selectively raises the temperature of the powder to a temperature sufficient for the powder to melt or fuse. In the case of heating-treatment, a light beam delivers heat so as to control the rate of cool down of the material.

As shown in FIGS. 1 and 3A, the air knife assembly 200 has an inlet unit or module 202 and an exhaust unit or module 204 that work in tandem to remove vapor and spatter from the volume above the platform with a gas received from the air knife assembly 200.

The retractable telescopic scissor assembly 149 of the air knife moving assembly 140 has a first arm assembly 262 and a second arm assembly 263 that each rotate inward or outward to extend or retract the retractable telescopic scissor assembly 149. As further described in detail below with respect to FIGS. 4A and 4B, the first arm assembly 262 includes a supply conduit 252 and a return conduit or chamber 250 (e.g., the interior of each arm), with the supply conduit 252 disposed inside the return chamber 250, and the second arm assembly 263 includes a second supply conduit 256 and a second return chamber 254. The second supply conduit 256 and second return chamber 254 are similar to the supply conduit and return chamber of the first arm assembly 262. The supply conduits and return chambers of the retractable telescopic scissor assembly 149 are fluidically connected to the air knife assembly 200 to supply gas and receive gas from the air knife assembly 200, respectively.

Figure 4A:
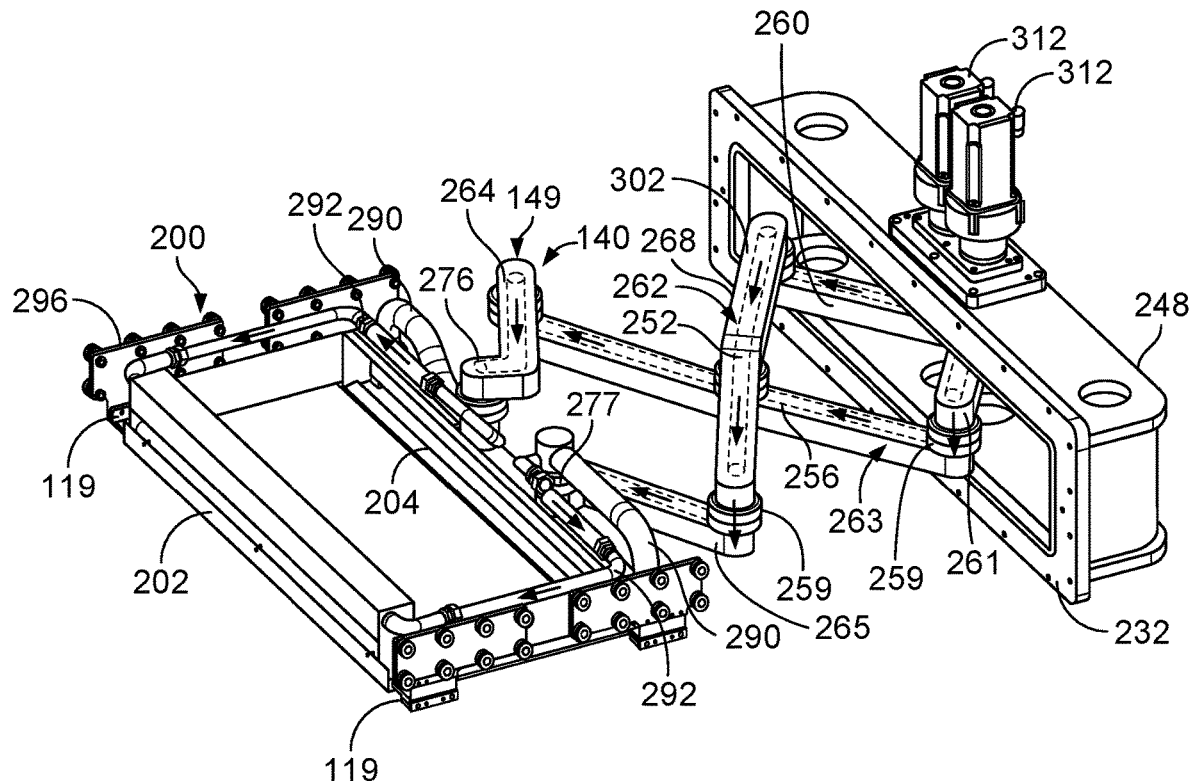
FIGS. 4A and 4B are schematic perspective views of an air knife unit and an air knife moving assembly of the additive manufacturing apparatus, showing a supply and return flow path, respectively, of the air knife moving assembly.
Figure 4B:
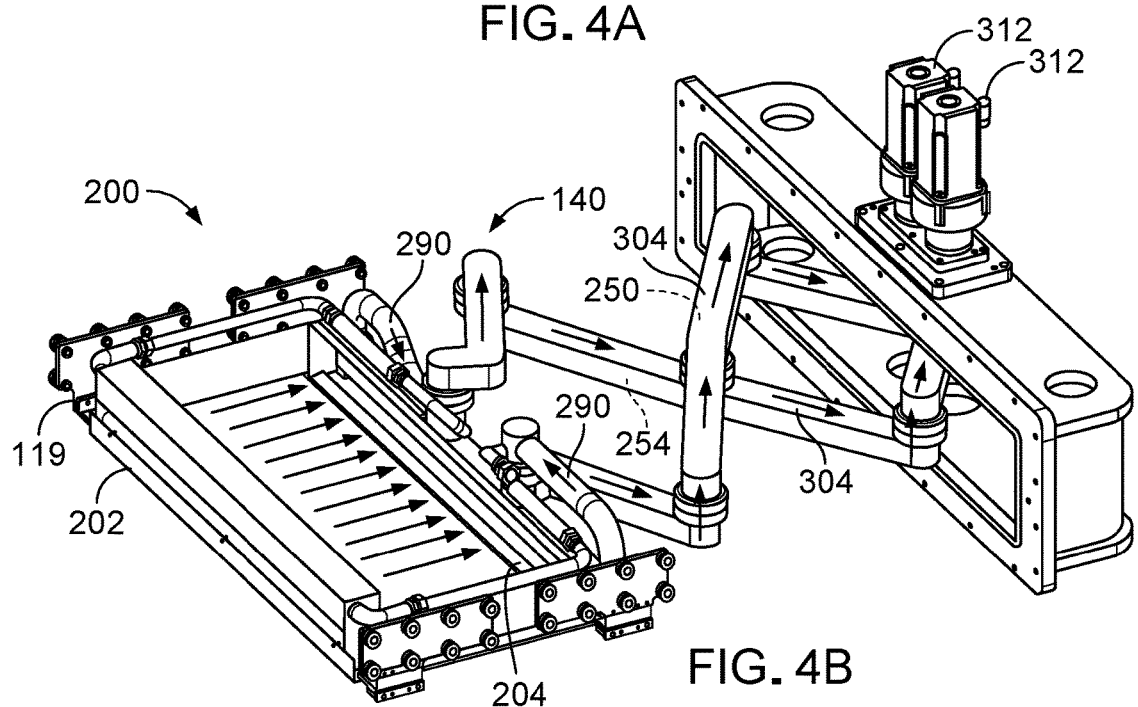

Referring to FIGS. 4A and 4B, the air knife moving assembly 140 moves the air knife assembly 200 and includes fluid conduits to supply gas to the air knife assembly 200. The air knife moving assembly 140 is rotatably coupled to the air knife assembly 200 to move the air knife assembly 200 along or across a surface of the platform 104. For example, the retractable telescopic scissor assembly 149 of the air knife moving assembly 140 has a first pair of arms 260 and 261 each having a first end rotatably coupled to a stationary portion (for example, the air knife storage chamber 248), and a second pair of arms 264 and 265 each having a second end 276 and 277 rotatably coupled to the air knife assembly 200. The first pair of arms 260 and 261 are coupled to respective actuators 312 (e.g., electric motors) that pivot or rotate the first pair of arms 260 and 261 to extend or retract the retractable telescopic scissor assembly 149.

A third pair of arms 262 and 263 can be used to connect the first pair of arms 260, 261 to the second pair of arms 264, 265. For example, the first ends of the third pair of arms 264, 265 can be coupled to the second ends of the first pair of arms 261, 262, and the second ends of the third pair of arms 264, 265 can be coupled to the first ends of the second pair of arms 261, 262. However, other configurations are possible for a scissors telescopic scissor assembly.

Figure 5A:
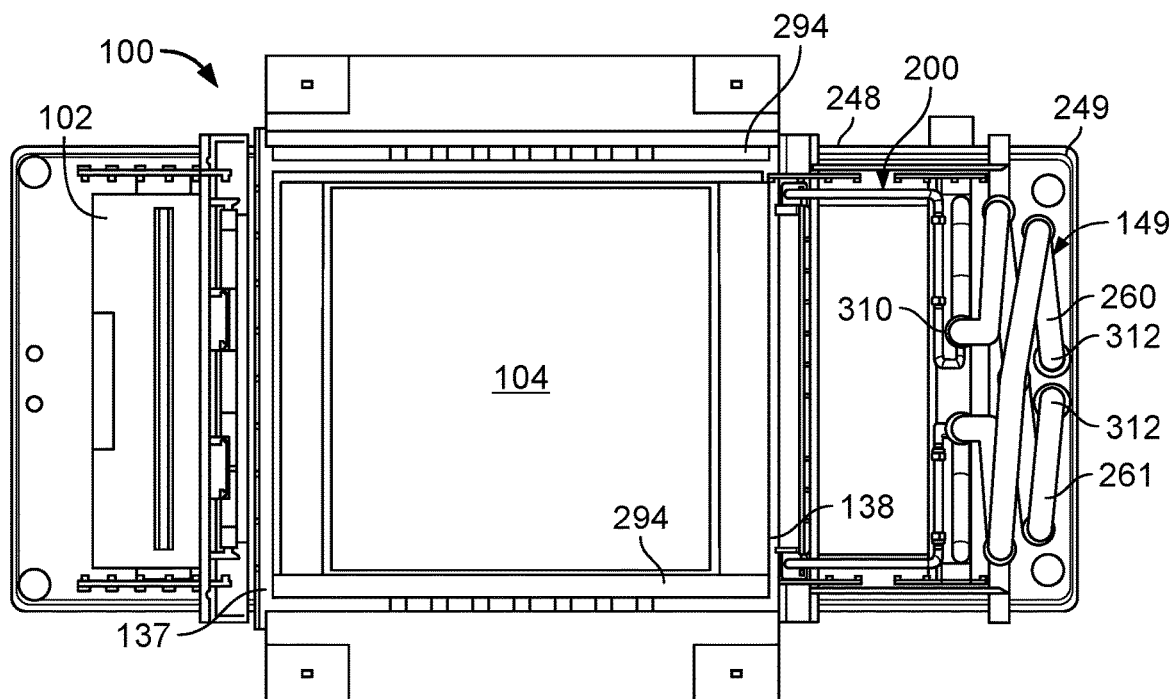
FIGS. 5A and 5B are schematic top views of the air knife unit and air knife moving assembly, showing the air knife moving assembly in retracted and extended positions, respectively.
Figure 5B:
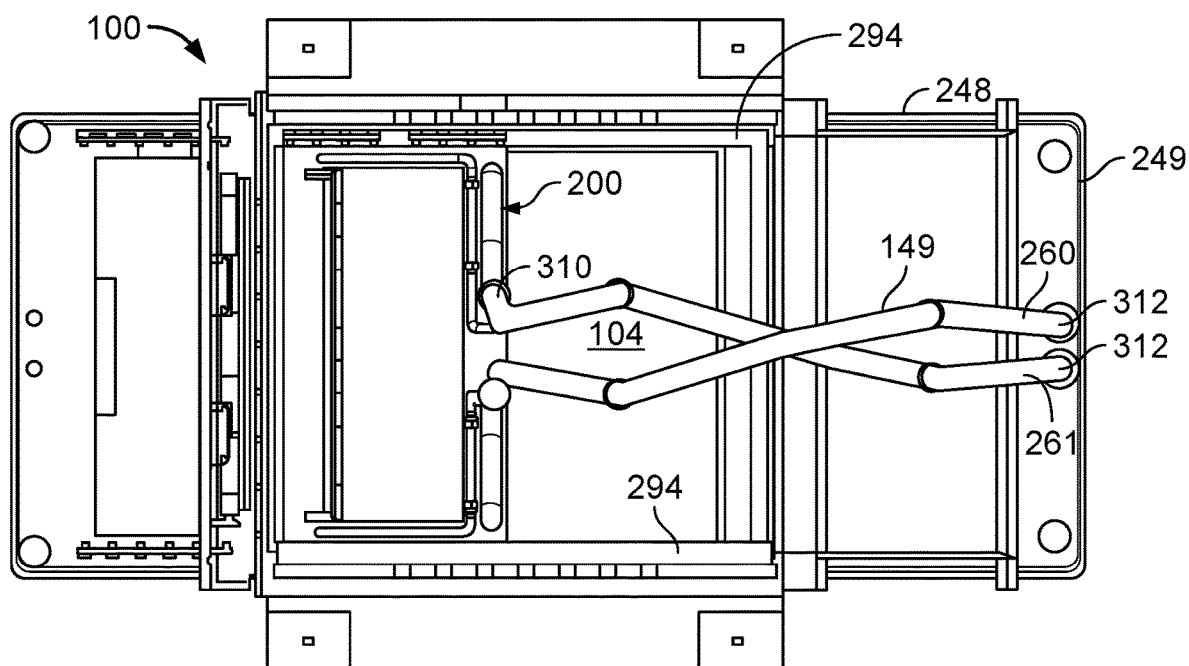

Referring to FIGS. 5A and 5B, each arm of the first pair of arms 260 and 261 is rotatably coupled to and movable by their respective actuator 312 at the load lock chamber 240. The pair of arms 260 and 261 can rotate, upon being actuated by their respective actuator 312, inwardly or outwardly to extend or retract the retractable telescopic scissor assembly 149. The apparatus 100 also includes a guide rail 119 that guides or constrains the air knife assembly 200 to move parallel to the surface of the platform 104 in a generally straight line as the retractable telescopic scissor assembly 149 retracts or extends to move the air knife assembly 200. The air knife moving assembly 140 can move the air knife assembly 200 from a first position (see FIG. 5A) removed from the platform 104 to a second position (see FIG. 5B) on top of and at a far end of the platform 104.

Referring back to FIG. 4A the retractable telescopic scissor assembly 149 provides gas to the air knife assembly 200 through the first gas supply conduit 252 and the second gas supply conduit 256. Referring to FIG. 4B, the retractable telescopic scissor assembly 149 receives the return gas from the air knife assembly 200 through the first gas return chamber 250 (e.g., the hollow interior of the arms) and the second gas return chamber 254.

Figure 4C:
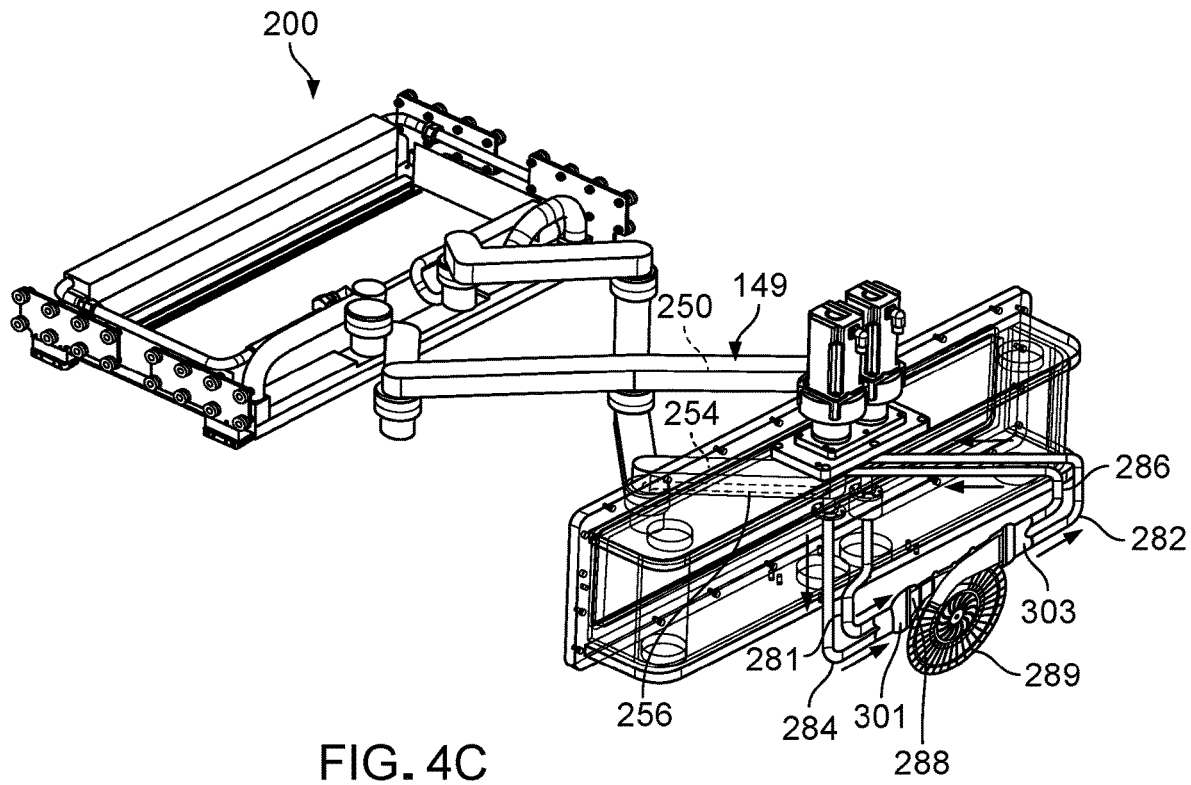
FIG. 4C is a schematic perspective view of the air knife unit and the air knife moving assembly showing a blower connected to supply and return conduits of the air knife moving assembly.
Figure 4D:
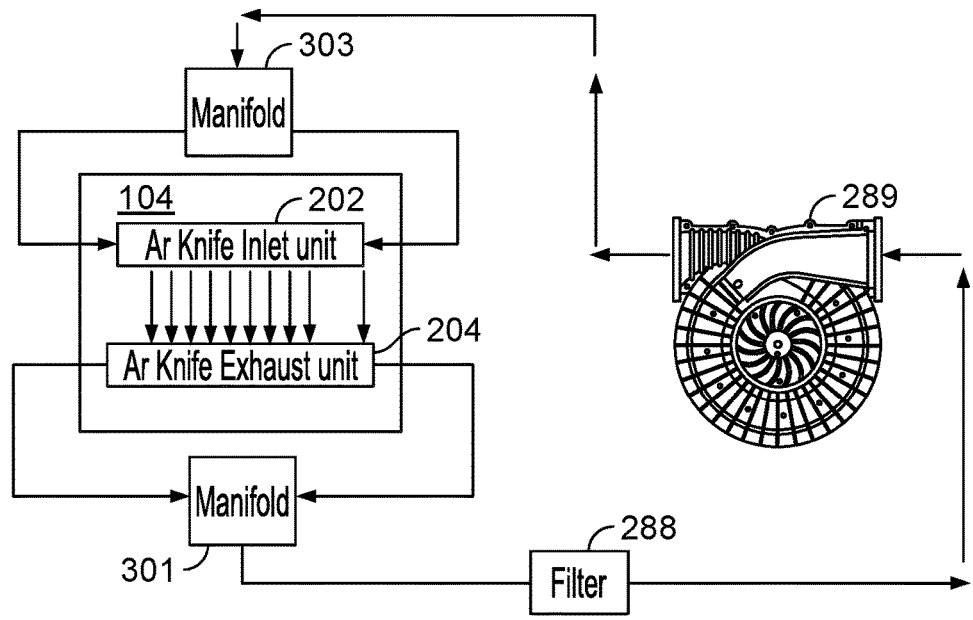
FIG. 4D is a block diagram of the supply and return flow paths of the air knife moving assembly.

Referring also to FIGS. 4C and 4D, the supply conduits 252 and 256 are fluidically connected to an outlet of a blower 289 and the return chambers 250 and 254 are fluidically connected to an inlet of the blower 289. For example, the supply conduits 252 and 256 can each be connected to respective supply hoses or conduits 282 and 286 that are fluidically connected to a first manifold 303 fluidically connected to the outlet of the blower 289. In some implementations, the supply conduits 252 and 256 of the retractable telescopic scissor assembly 149 can be directly coupled to the first manifold 303. Similarly, the return chambers 250 and 254 can be fluidically coupled to respective return hoses or conduits 281 and 284 that are fluidically connected to a second manifold 301 fluidically connected to the inlet of the blower 289. The second manifold 301 can be fluidically connected to a filter 288 that prevents some particles from entering the blower 289.

The blower 289 is configured to flow gas through the supply and return conduits at substantially equal rates. For example, the blower 289 can blow (or exhausts) about 3800 liters per minute to maintain about 93% velocity or pressure uniformity across the platform 104.

Referring to FIG. 4A, each supply conduit 252 and 256 extends continuously along respective arms 262 and 263 of the retractable telescopic scissor assembly 149. For example, as described earlier with respect to FIG. 3A, the retractable telescopic scissor assembly 149 has a first arm assembly 262 and a second arm assembly 263. The first arm assembly 262 has three arms rotatably connected to one another. The first arm assembly 262 has a first arm 260, a second, middle arm 268, and a third arm 264. The first arm 260 is rotatably connected, at a first end to the air knife storage chamber 248 and rotatably connected, at a second, opposite end to the middle arm 268. The middle arm is 268 is rotatably connected to the first arm 260 at a first end and to the third arm 264 at a second, opposite end of the middle arm 268. The third arm 264 is rotatably connected to the middle arm 268 at a first end and rotatably connected to the air knife assembly 200 at a second, opposite end of the third arm 264. The second arm assembly 263 is similar to the first arm assembly 262, with three arms rotatably connected to each other. The middle arm 268 of the first arm assembly is rotatably connected, at a middle point of the arm, to a middle arm 269 of the second arm assembly 263. The gas supply conduits 252 and 256 extend continuously along the length and joints 259 (e.g., rotary pneumatic joints) of the arm assemblies 262 and 263. The return gas flows continuously around and exterior surface of supply conduits 252 and 256, inside each arm of the retractable telescopic scissor assembly 149.

The supply conduits 252 and 256 of the retractable telescopic scissor assembly 149 are both fluidically connected to respective third fluid supply conduits 292 of the air knife assembly 200. The supply conduits 292 of the air knife assembly 200 fluidically connect the inlet unit 202 of the air knife assembly 200 to the gas supply conduits 252 and 256 of the retractable telescopic scissor assembly 149. Specifically, the third supply conduits 292 are fluidically coupled to respective supply conduits 252 and 256 of the retractable telescopic scissor assembly 149 to receive the gas from the supply conduits 252 and 256. One of the third supply conduits 292 delivers gas to the inlet unit 202 at a first, lateral end of the inlet unit 202, and another one of the third supply conduits 292 delivers gas to the inlet unit 202 at a second, lateral end of the inlet unit 202 opposite the first lateral end.

Referring to FIG. 4B, the gas return chambers 250 and 254 are fluidically connected to the exhaust unit 204 of the air knife assembly 200. The gas return chambers 250 and 254 of the retractable telescopic scissor assembly 149 are both fluidically connected to respective third fluid return conduits 290 of the air knife assembly 200. The return conduits 290 of the air knife assembly 200 fluidically connect the exhaust unit 204 of the air knife assembly 200 to the gas return chambers 250 and 254 of the retractable telescopic scissor assembly 149. Specifically, the third return conduits 290 are fluidically coupled to respective return chambers 250 and 254 of the retractable telescopic scissor assembly 149 to flow the gas from the exhaust unit 204 to the return chambers 250 and 254. One of the third supply conduits 290 receives gas from the exhaust unit 204 at a first, lateral end of the exhaust unit 204, and another one of the third return conduits 290 receives gas from the exhaust unit 204 at a second, lateral end of the exhaust unit 204, opposite the first lateral end.

Referring back to FIGS. 1 and 3A, the inlet unit 202 and the exhaust unit 204 of the air knife assembly 200 are positioned on opposite sides of the air knife assembly 200, with the exhaust unit 204 spaced apart from and facing the inlet unit 202. The inlet unit 202 supplies the gas from the gas blowers 244 and 242 (see FIG. 4A) over the platform surface 105 to remove burn waste and be received by the exhaust unit 204, which in turn sends the received gas from over the platform 104 back to the gas blowers 244 and 242.

Figure 6A:
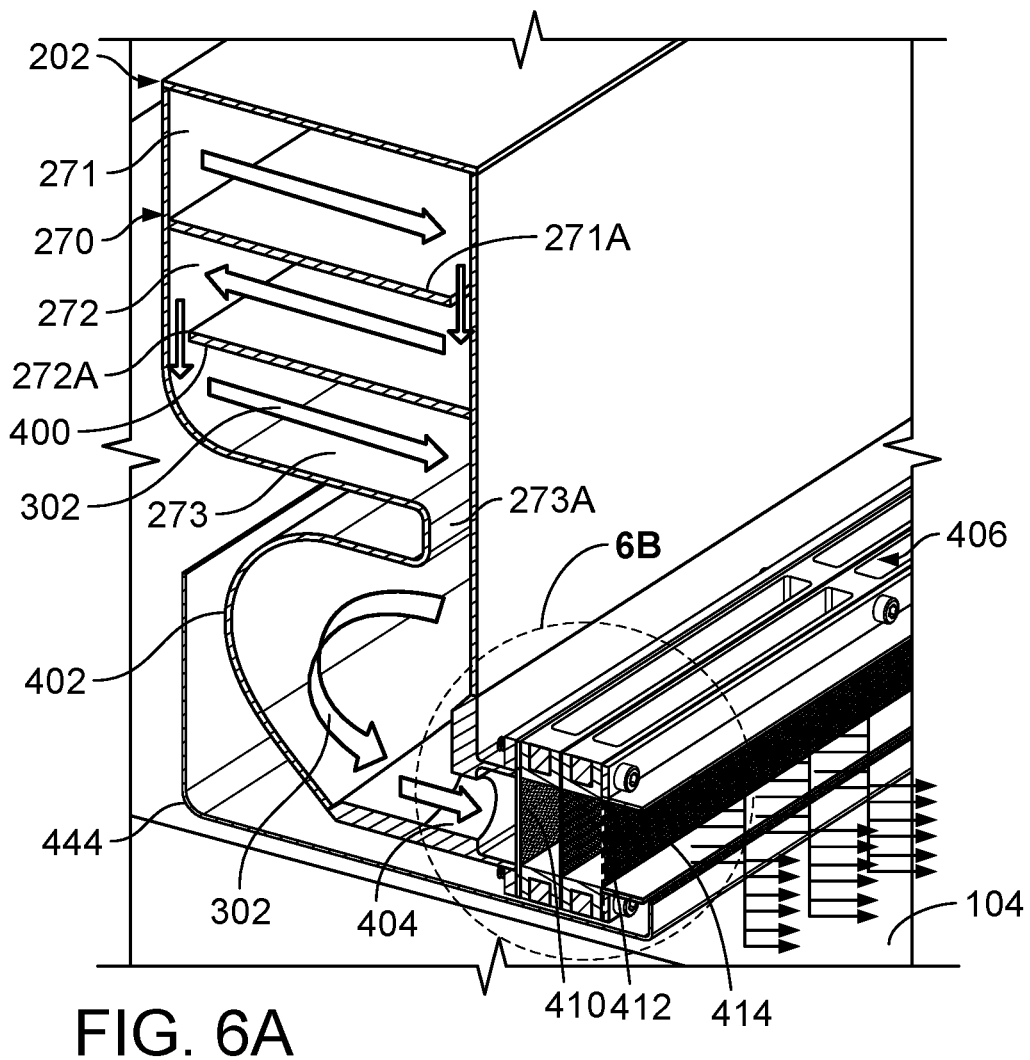
FIG. 6A is a schematic perspective view, partially cross-sectional, of a portion of the air knife unit.

Referring to FIG. 6A, the gas inlet unit 202 has a multi-chamber plenum 270 that has multiple vertically stacked chambers 271, 272, 273, and 402 that are fluidically connected. The first chamber 271 of the plurality of vertically stacked chambers is positioned at a higher elevation vertically than the last chamber (for example, a collection chamber) 402 of the plurality of vertically stacked chambers. The vertically stacked chambers 271, 272, 273, and 402 are fluidically connected by respective apertures 271a, 272a, and 273a positioned to form a circuitous flow path 302 for the gas between the first chamber 271 and the collection chamber 402. The apertures 271a, 272a, and 273a can span the longitudinal length of the chambers 271, 272, 273, and 402. Alternatively, each single aperture can be replaced by multiple discrete spaced apart holes. The chambers 271, 272, 273, and 402 span the longitudinal length of the inlet unit 202. The multiple vertically stacked chambers 271, 272, 273, and 402 are longitudinally horizontal chambers that, looking from a side, form a flow path for the gas that has multiple reversals in direction, e.g., an S-shape cross section.

The inlet unit 202 also has a gas distribution module 406 fluidically coupled to the collection chamber 402. The gas distribution module 406 has multiple perforated sheets 410, 412, and 414 positioned for the gas to flow out of the collection chamber 402, through perforations of the perforated sheets 410, 412, and 414 and over the platform 104. The inlet unit 202 also has a heat shield plate 444 disposed underneath the collection chamber 402 and the gas distribution module 404. The heat shield plate 444 shields the inlet unit 202 from heat generated at the platform 104, e.g., from the heated powder.

Figure 7:
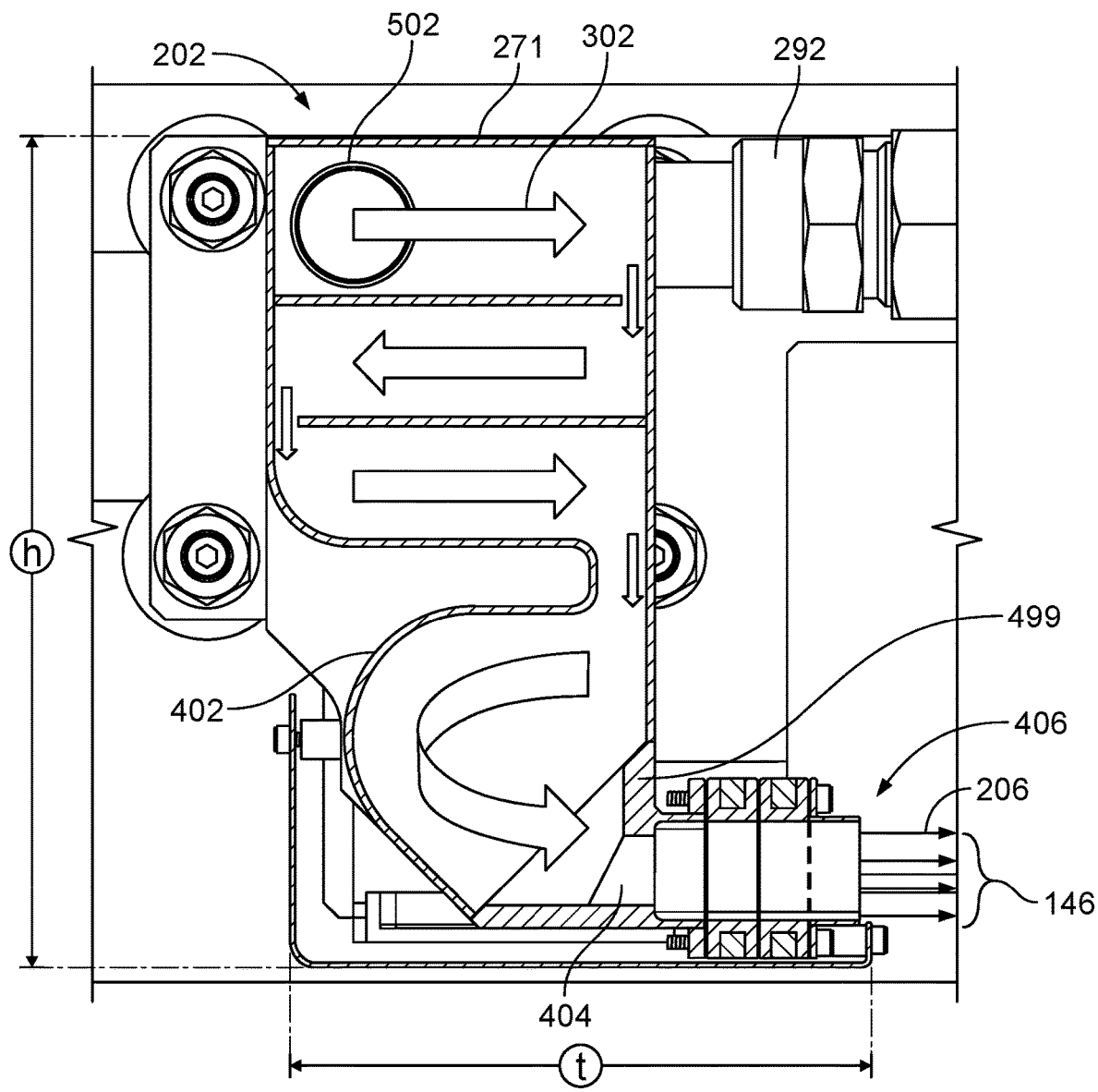
FIG. 7 is a schematic side view of the portion of the air knife unit of FIG. 6A.

Referring also to FIG. 7, the inlet unit 202 also includes a gas inlet 502 configured to supply gas into the first chamber 271 of the plurality of vertically stacked chambers 271, 272, 273, and 402. The gas inlet 502 is fluidically connected to the third supply conduit 292 of the air knife assembly 200. The gas inlet can be in the side wall so that the gas enters the uppermost chamber 271 in a direction perpendicular to the eventual gas flow 206 from the distribution module 406. The vertical configuration of the chambers increases the distance traveled by the gas, while reducing the horizontal footprint of the inlet unit 202. The longer the distance traveled by the gas, the more uniform is the pressure and velocity of the gas. The inlet unit 202 has a height 'h' of about 170 millimeters and a thickness 't' of about 120 millimeters.

The chambers 271, 272, 273, and 402 guide the gas from the gas inlet 502 to the collection chamber 402, to be derived from the collection chamber to the gas distribution module 406. The gas leaves the gas distribution module 406 to flow along a portion 146 of the open volume that is adjacent the material layer on the build platform 104. The portion 146 can include a height of about 20 to 30 millimeters. In other words, the gas leaves the inlet unit 202 to form a gas curtain with a height of about 20 to 30 millimeters. The gas distribution module 406 discharges the gas in a laminar flow parallel to the top surface of the platform 104.

Figure 6B:
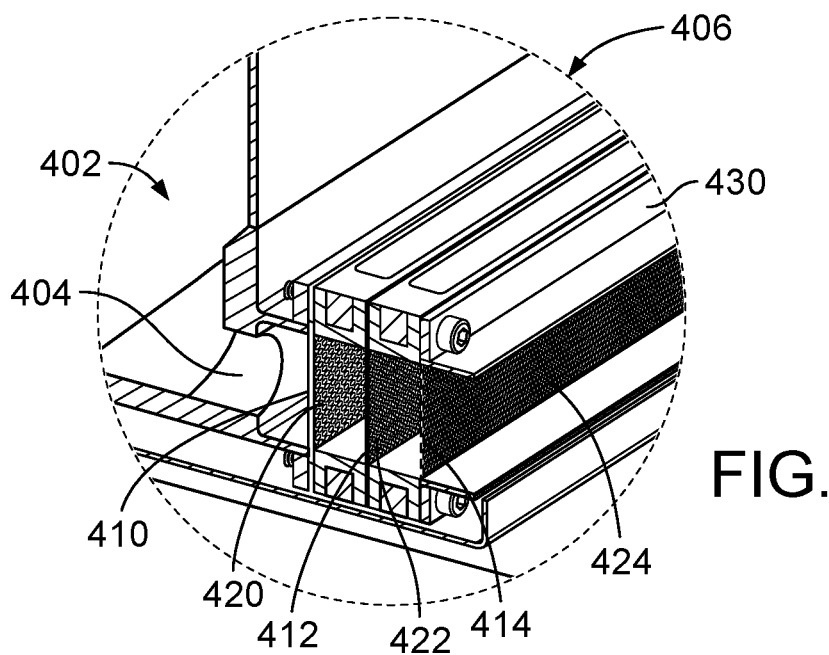
FIG. 6B is a detail view of the portion of the air knife unit, taken along line 6B-6B in FIG. 6A.

Referring to FIG. 6B, the gas distribution module 406 includes multiple horizontally longitudinal housings defined between the three perforated sheets 410, 412, and 414. The three perforated sheets 410, 412, and 414 can be arranged in parallel and spaced apart along the direction of gas flow 206 across the platform. The perforated sheets 410, 412, and 414 have apertures that decrease in size along the flow direction of the gas, with the first sheet (e.g., the upstream sheet) 410 having the largest apertures. For example, the first perforated sheet 410 defines first apertures 420, the second, middle perforated sheet 412 defines second apertures 422 smaller than the first apertures 420, and the third perforated sheet 414 defines third apertures 424 smaller than the second apertures 422. The second sheet 412 is disposed between the first sheet 410 and the third sheet 414. The first perforated sheet 410 can have a perforated area of about 30-40% of the area of the sheet to let the gas pass through, the second perforated sheet 412 can have a perforated area of about 25-30% to let gas pass through, and the third perforated sheet can have a perforated area of about 20-25% to let gas pass through. The air accumulation in each space or housing between the sheets 410, 412, and 414 can even out the gas pressure to deliver, at the last sheet 414, a laminar flow of gas with generally uniform pressure and velocity. Each perforated sheet 410, 412, and 414 has a horizontal length (for example, a width) substantially equal to a length of the collection chamber 402.

Figure 8:
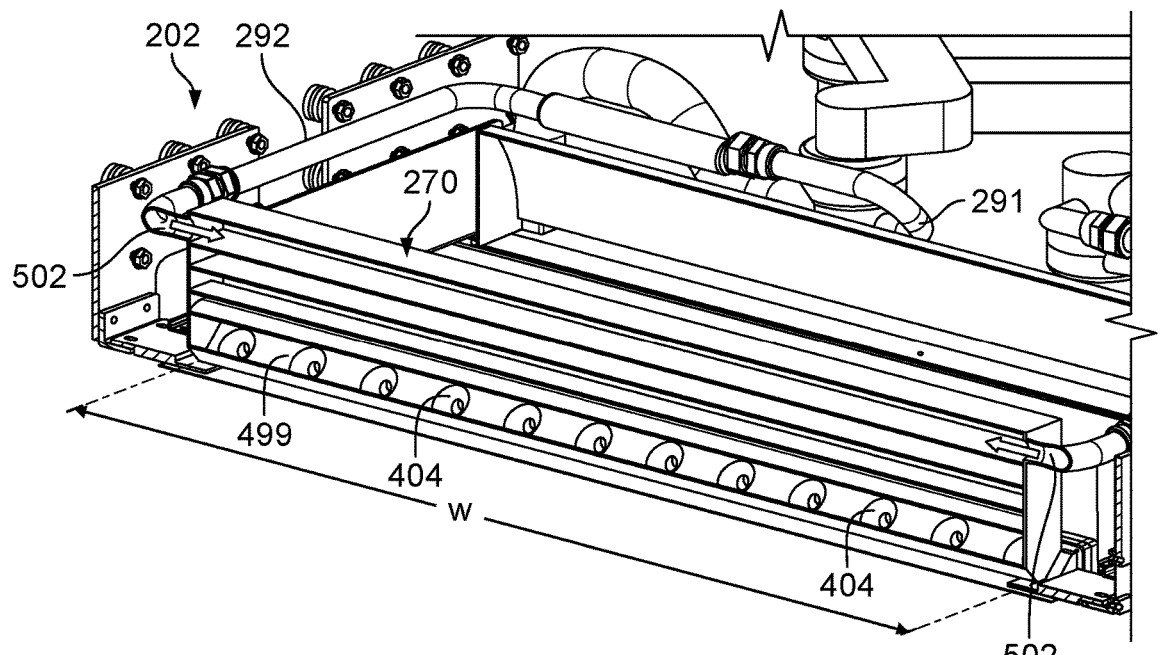
FIG. 8 is a schematic perspective view, partially cross-sectional, of the air knife unit.

Referring to FIGS. 7 and 8, the collection chamber 402 has a longitudinally horizontal wall 499 that defines multiple nozzles 404 that converge in the direction of the gas flow, with fluid outlets facing the gas distribution module 406. The wall 499 of the collection chamber 402 can have 12 nozzles 404 distributed evenly along a width 'w' of the wall 499. The width 'w' of the wall can be about 1000 millimeters. Each convolution of the multi-chamber plenum 270 distributes the gas (for example, reduces the turbulence of the gas), and the nozzles 404 help redistribute the volume of gas even further to increase the uniformity of the gas flow.

Figure 9:
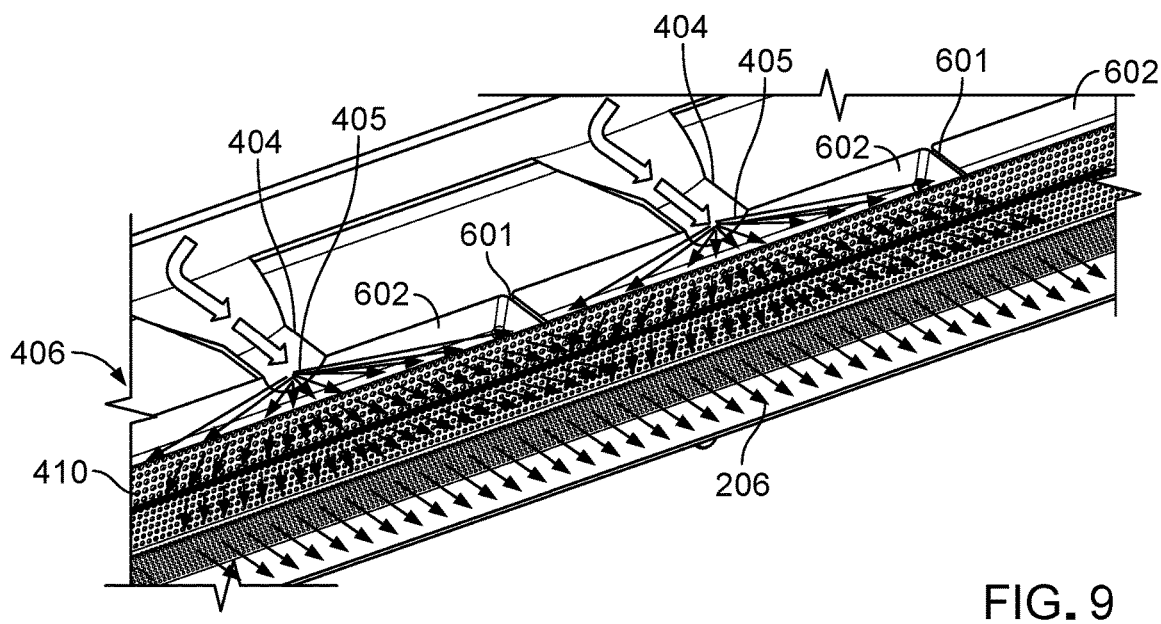
FIG. 9 is a schematic perspective view, partially cross-sectional, of a portion of the air knife unit showing nozzles of the portion of the air knife unit.

Referring to FIG. 9, the gas distribution module 406 has, between the fluid outlets 405 of the nozzles 404 and the first perforated sheet 410, multiple plenums 602. The plenums 602 are defined between partitions 601 that define spaces of generally equal longitudinal length. The plenums 602 can be evenly distributed along the width of the gas distribution module 406, with each plenum 602 being associated with a respective nozzle 404. For example, if there are twelve nozzles 404, there can be twelve plenums 602. Each plenum 602 receives gas from a respective nozzle 404 to increase the pressure of the gas in the respective plenum 602 as gas accumulates and then leaves the respective plenum 602 through a respective portion of the first perforated sheet 410.

Figure 10:
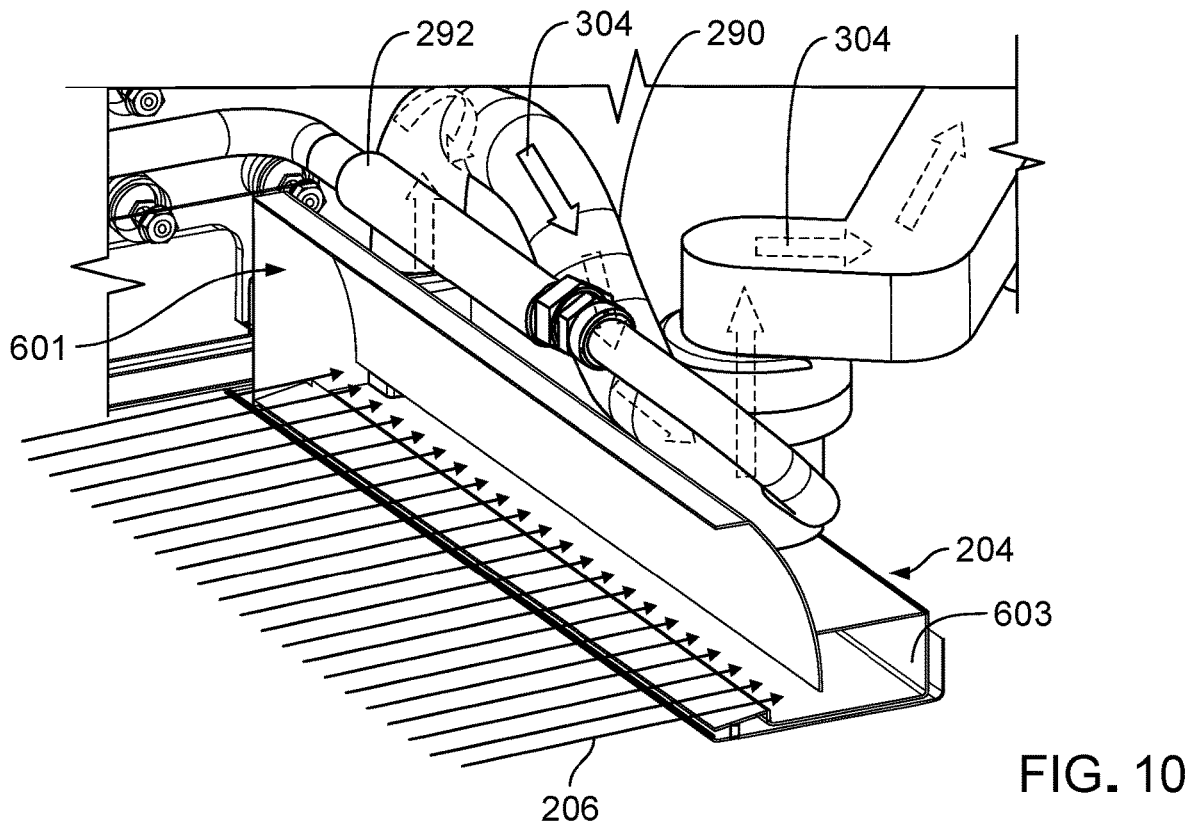
FIG. 10 is a schematic perspective view, partially cross-sectional, of a different portion of the air knife unit.
Figure 11:
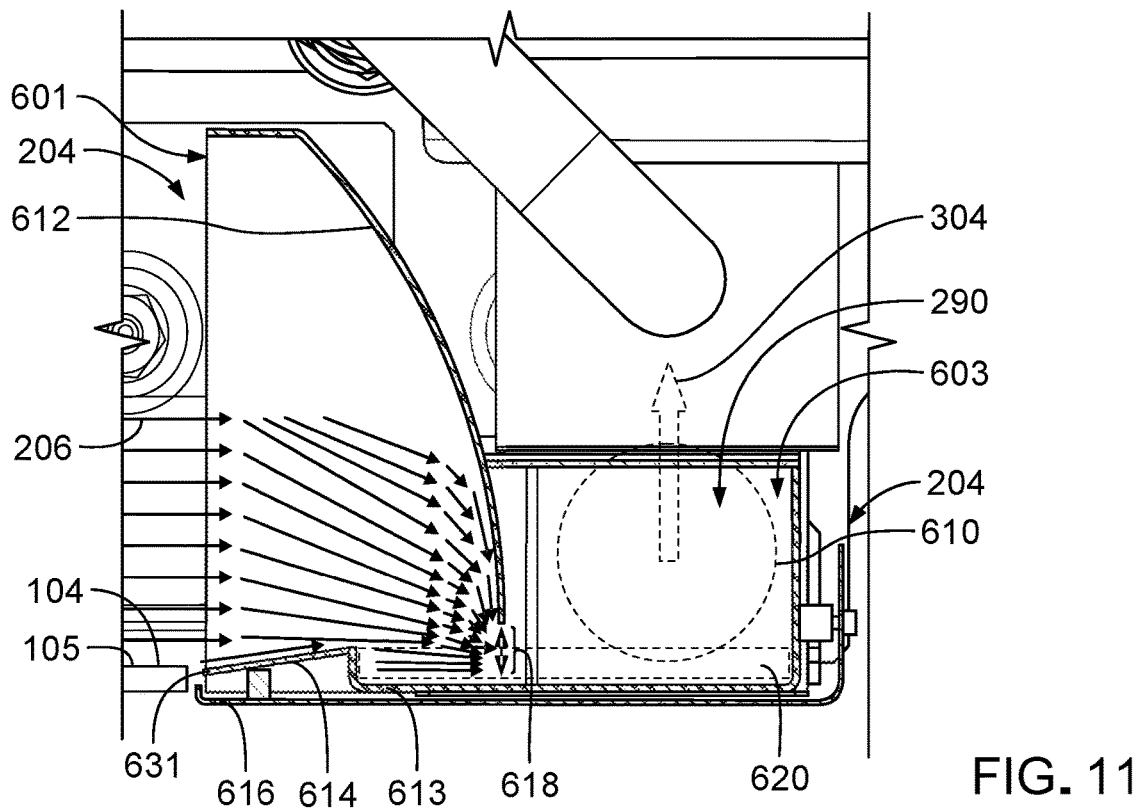
FIG. 11 is a schematic side view of the portion of the air knife unit of FIG. 10.

Referring to FIGS. 10 and 11, the exhaust unit 204 of the air knife assembly 200 has a plenum 603 with a port 610 connected to the gas return conduit 290 of the air knife assembly 200. As shown in FIG. 10, the port 610 of the exhaust unit 204 is disposed at a first lateral side of the plenum 603, and a second port is disposed at a second lateral side of the plenum 603, opposite the first lateral side. Additionally, the exhaust unit 204 has a gas collector 601 that includes a concave plate 612, a ramp plate 614, and a portion of a base plate 613 of the exhaust unit 204. The gas collector 601 is open at a front end to receive gas 206 from over the platform. The concave plate 612 is disposed at a back end of the gas collector 601. The exhaust unit 204 defines an aperture 618 formed at a back of the concave plate 612, between the gas collector 601 and the plenum 603 that provides a constricted flow path for gas 206 from the collector 601 to the plenum 603.

The aperture 618 can be a longitudinally horizontal slot. The longitudinally horizontal slot can have a height of between 9 millimeters and 11 millimeters. The optimal height of the slot depends on the velocity of the gas flowing over the platform 104. The longitudinally horizontal slot extends across a width of the gas collector 601.

The concave plate 612 is arranged to deflect the gas from over the platform 104 toward the aperture 618. For example, the curvature of the concave plate 612 has a radius that deflects the gas downward and toward the aperture 618, instead of reflecting the gas back to the platform 104.

The ramp plate 614 of the gas collector 601 is disposed at a front end or in front of the concave plate 612. The ramp plate 614 has a low end 631 adjacent the top surface 105 of the platform 104 such that the ramp plate 614 deflects the gas from over the platform 104 upwardly with respect to the platform 104, to form a residual collection pit 620 at the base of the plenum 603. The residual collection pit 620 captures the particles from over the platform 104 so the particles don't return to the blowers and then to the platform 104. For example, light debris would be taken out through exhaust, but heavier particles can settle in the collection pit 620.

The exhaust unit 204 also has a heat shield plate 616 disposed underneath the gas collector 601 and the plenum 603 to shield the exhaust unit 204 from heat generated at the platform 104.

The air knife assembly 200 can deliver flow velocities of 2-3 m/s. The gas can be an inert gas, e.g., Argon. Such velocity ensures that particles or burnt waste is removed from the platform 104.

Referring back to FIG. 1, the apparatus 100 includes a controller 195 coupled to the various components of the apparatus, e.g., power sources for the light sources and heaters, actuators and/or motors to move the air knife moving assembly 140, actuators and/or motors for the components, e.g., dispensers and beam scanners, within the printhead 102, to cause the apparatus to perform the necessary operations to fabricate an object.

The controller 195 can include a computer aided design (CAD) system that receives and/or generates CAD data. The CAD data is indicative of the object to be formed, and, as described herein, can be used to determine properties of the structures formed during additive manufacturing processes. Based on the CAD data, the controller 195 can generate instructions usable by each of the systems operable with the controller 195, for example, to dispense the powder 106, to fuse the powder 106, to move various systems of the apparatus 100, and to sense properties of the systems, powder, and/or the object 10. In some implementations, the controller 195 can control the first and second dispensing systems 112, 122 to selectively deliver the first and the second powder particles 106, 108 to different regions.

The controller 195, for example, can transmit control signals to drive mechanisms that move various components of the apparatus. In some implementations, the drive mechanisms can cause translation and/or rotation of these different systems, including. Each of the drive mechanisms can include one or more actuators, linkages, and other mechanical or electromechanical parts to enable movement of the components of the apparatus.

CONCLUSION

The controller and other computing devices part of systems described herein can be implemented in digital electronic circuitry, or in computer software, firmware, or hardware. For example, the controller can include a processor to execute a computer program as stored in a computer program product, e.g., in a non-transitory machine readable storage medium. Such a computer program (also known as a program, software, software application, or code) can be written in any form of programming language, including compiled or interpreted languages, and it can be deployed in any form, including as a standalone program or as a module, component, subroutine, or other unit suitable for use in a computing environment.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

A number of implementations have been described. Nevertheless, it will be understood that various modifications may be made. For example:

Other techniques can be used for dispensing the powder. For example, powder could be dispensed in a carrier fluid, e.g., a quickly evaporating liquid such as Isopropyl Alcohol (IPA), ethanol, or N-Methyl-2-pyrrolidone (NMP), and/or ejected from a piezoelectric printhead. Alternatively, the powder could be pushed by a blade from a powder reservoir adjacent the build platform.

Although FIG. 3B illustrates three galvo scanners, the system could have a larger or smaller number of each kind of scanner, and could also include polygon scanners. For example, the system could include just a single polygon scanner, just a single galvo scanner, just two polygon scanners, just two galvo scanners, or a single polygon scanner and a single galvo scanner, two each of galvo and polygon scanners, etc. Any given scanner could be used for pre-heating and/or heat treatment and/or fusing of the powder.

For some powders, an electron beam could be used instead of a laser beam to fuse the powder. So the second energy delivery system could include an electron beam source and electron beam scanner rather than a light source and pair of galvo mirror scanners.

Accordingly, other implementations are within the scope of the claims

What is claimed is:

1. An additive manufacturing apparatus comprising:
an environmentally sealed first chamber;
a second chamber separated from the first chamber by a first valve that is movable between a closed state in which the second chamber is sealed from the first chamber and an open state in which the first chamber is accessible from the second chamber;
a platform positionable in the first chamber;
a dispenser configured to deliver a plurality of successive layers of feed material onto the platform in the first chamber;
at least one energy source to selectively fuse the feed material in a layer on the platform in the first chamber;
an air knife assembly to direct a laminar flow of air across the layer of the feed material on the platform in the first chamber, the air knife assembly including an inlet module and an exhaust module that are extendable and retractable through the first valve between the first chamber and the second chamber; and
a controller configured to cause the first valve to open, cause an actuator to extend the inlet module and exhaust module through the first valve from the second chamber to the first chamber, cause the actuator to retract the inlet module and exhaust module through the first valve from the first chamber to the second chamber, and cause the first valve to close.

2. The apparatus of claim 1, wherein the controller is configured to cause the air knife assembly to direct the laminar flow of the air across the layer of the feed material on the platform in the first chamber while the energy source selectively fuses the feed material in the layer.

3. The apparatus of claim 2, wherein the controller is configured to cause the dispenser to deliver a subsequent layer of the feed material over the platform while the inlet module and the exhaust module are in the second chamber.

4. The apparatus of claim 1, wherein the air knife assembly includes a support for the inlet module and the exhaust module, and the support is extendible from and retractable into the second chamber.

5. The apparatus of claim 4, wherein the support includes a retractable telescopic scissor assembly.

6. The apparatus of claim 1, further comprising a third chamber separated from the first chamber by a second valve, and wherein the dispenser is extendable and retractable through the second valve between the third chamber and the first chamber.

7. The apparatus of claim 6, comprising a controller configured to, while the first valve is closed, cause the second valve to open, cause a first actuator to extend the dispenser through the second valve from the third chamber to the first chamber, cause the dispenser to deliver the layer of the feed material over the platform, cause the first actuator to retract the dispenser through the second valve from the first chamber to the third chamber, and close the second valve.

8. An additive manufacturing apparatus comprising:
an environmentally sealed first chamber;
a third chamber separated from the first chamber by a second valve that is movable between a closed state in which the third chamber is sealed from the first chamber and an open state in which the first chamber is accessible from the third chamber;
a platform positionable in the first chamber;
a dispenser configured to deliver a plurality of successive layers of feed material onto the platform in the first chamber, the dispenser is extendable and retractable through the second valve between the first chamber and the third chamber;
at least one energy source to selectively fuse feed material in a layer on the platform in the first chamber;
an air knife assembly to direct a laminar flow of air across the layer of the feed material on the platform in the first chamber; and
a controller configured to cause the second valve to open, cause a first actuator to extend the dispenser through the second valve from the third chamber to the first chamber, cause the first actuator to retract the dispenser through the second valve from the first chamber to the third chamber, and cause the second valve to close.

9. The apparatus of claim 8, wherein the controller is configured to cause the dispenser to deliver the layer of the feed material over the platform.

10. The apparatus of claim 9, wherein the controller is configured to cause the energy source to selectively fuse the layer of the feed material and cause the air knife assembly to direct the laminar flow of the air across the layer of the feed material while the dispenser is in the third chamber.

11. The apparatus of claim 8, wherein the dispenser is extendable and retractable along a linear rail.

12. The apparatus of claim 5, wherein the retractable telescopic scissor assembly comprises a first pair of arms each having a first end rotatably coupled to a stationary portion of the additive manufacturing apparatus and a second pair of arms each having a second end rotatably coupled to the inlet module and exhaust module.

13. The apparatus of claim 12, wherein the retractable telescopic scissor assembly comprises a supply conduit that fluidically connects a gas inlet in the stationary portion to the inlet module and a return conduit that fluidically connects the exhaust module to a gas outlet in the stationary portion, each conduit extending continuously along arms of the retractable telescopic scissor assembly.

14. The apparatus of claim 1, further comprising a pump coupled to the first chamber to vacuum out the first chamber.

15. The apparatus of claim 1, wherein the first valve is a slit valve.

16. The apparatus of claim 8, wherein the second valve is a slit valve.

* * * * *